United States Patent [19]

Freeland

[11] Patent Number: 5,554,713
[45] Date of Patent: Sep. 10, 1996

[54] THERMOSETTING CASTABLE AND CURABLE POLYURETHANE-UREA POLYMERS HAVING IMPROVED FLOW AND END-WASTE CHARACTERISTICS FOR INSULATING THERMAL BARRIERS

[75] Inventor: Gerard S. Freeland, Lawton, Mich.

[73] Assignee: Azon USA Inc., Kalamazoo, Mich.

[21] Appl. No.: 369,701

[22] Filed: Jan. 6, 1995

[51] Int. Cl.$^6$ .................. C08G 18/48; C08G 18/42; E04B 1/78; E06B 1/12
[52] U.S. Cl. .................. 528/76; 528/77; 528/80; 524/791; 49/DIG. 1; 52/309.14; 52/309.16; 52/730.1; 52/730.4; 52/732.1; 428/423.1; 428/425.8
[58] Field of Search .............. 524/791; 528/76, 528/77, 80; 49/DIG. 1; 52/309.14, 309.16, 730.1, 730.4, 732.1; 428/423.1, 425.8

[56] References Cited

U.S. PATENT DOCUMENTS

| | | | |
|---|---|---|---|
| 3,681,291 | 8/1972 | Khan | 528/76 |
| 3,815,216 | 6/1974 | Brockway et al. | 52/309 |
| 4,124,572 | 11/1978 | Mao | 528/76 |
| 4,704,839 | 11/1987 | Kay | 52/732 |
| 4,808,636 | 2/1989 | Saito et al. | 528/77 |
| 5,022,205 | 6/1991 | Ford | 52/309.16 |
| 5,028,684 | 7/1991 | Neuhaus et al. | 528/77 |
| 5,128,433 | 7/1992 | Le Compte et al. | 528/60 |
| 5,130,404 | 7/1992 | Freeland | 528/76 |
| 5,391,436 | 2/1995 | Reid | 428/423.1 |

*Primary Examiner*—Shelley A. Dodson
*Assistant Examiner*—Rabon Sergent
*Attorney, Agent, or Firm*—The Firm of Gordon W. Hueschen

[57] ABSTRACT

Polyurethane-urea polymers comprising inter-reacted isocyanate A), diol or polyol components B) and C), chain-extending glycol component D), polyester diol or polyol component E), and polyamine component F) using a polyurethane catalyst G) and an optional drying agent, each component having the further characteristics set forth in the Specification and each component being present in the relative proportions by weight as set forth in the Specification, have improved characteristics including a reduced flow time and diminished end-waste characteristics which obviate the necessity of taping a channel in a metal extrusion into which such polymers are poured to provide a thermal barrier in the bridged or debridged channel and are accordingly advantageously employed as thermal barriers in such structures.

24 Claims, 1 Drawing Sheet

THERMOSETTING CASTABLE AND CURABLE POLYURETHANE-UREA POLYMERS HAVING IMPROVED FLOW AND END-WASTE CHARACTERISTICS FOR INSULATING THERMAL BARRIERS

BACKGROUND OF THE INVENTION

1. Field of the Invention

Castable and curable polyurethane-urea polymers having improved flow and end-waste characteristics suitable for providing an insulating thermal barrier in a metal, especially in an aluminum, extrusion.

2. Background of the Invention and Prior Art

There are many types of castable thermosetting polyurethane and polyurethane/urea elastomers of various compositions available on the market today. Many of these materials contain polyamines. However, when used as a structural thermal barrier in metal, e.g., aluminum, extrusions, the polyurethanes and/or polyurethane ureas and/or other polymers currently on the market have serious limitations. For example, the standard polyurethanes necessitate the application of tape to the ends of the extrusion to contain the liquid polymeric component until it gels and hardens or cures. The reason for taping is based on the pour and debridge system in widespread use. The isocyanate and resin components are metered volumetrically by a pumping system. The pumping system moves the component materials from tank reservoirs to a mixing head which blends the chemicals using either a static tube or a mechanical mixer. The blended chemicals then flow through a dispensing tube into an open-ended U-shaped cavity provided in the extrusion. Up to the present invention, the open ends of such cavities have required taping so that the liquid polymeric chemical did not flow out before hardening. Once the chemical has hardened properly, the extrusion is transferred to a debridge saw where the bottom side of the U-shaped cavity is removed, leaving a non-conductive "thermal barrier" of polymeric material between the two sides of the extrusion, as shown in the drawings.

The material of the present invention is a castable and curable thermosetting polyurethane/urea polymer which has improved gelation characteristics, especially as they relate to the insulating thermal barrier metal, especially aluminum, extrusion industry. These gelation characteristics are unique and provide a condensed or diminished flow time when compared to standard polyurethane systems. Flow time can be described as the time from which the mixed liquid polymeric components flow freely until the time at which the partially reacted but still reacting materials no longer flow. The flow time of the materials of the present invention has been reduced to not greater than about six seconds, preferably not greater than about two seconds, while essentially maintaining normal gel times. This decreased flow time characteristic provides an important advantage, namely, the elimination of the necessity of taping the ends of extrusions during the filling operation, which was previously necessary, and at the same time substantially decreases the end waste of the extrusion. The end waste is the leading and trailing portion of an extrusion which contains insufficient polymeric, e.g., polyurethane, filling, due to polymeric material running out of the extrusion, or due to shrinkage of the polymeric material during its transformation from a liquid to a solid.

As stated, the material of the present invention thus provides several advantages. Up till now, there has been a need to have some means by which adhesive tape was applied to the ends of the extrusion channel involving either a manual or mechanical method. The present material gives an immediate increase in viscosity and eliminates the need for taping the extrusion ends and thereby decreases labor and cost. The non-flowing characteristic of the present material, produced from commercially-available ingredients to achieve the end result of a pour-in-place thermal barrier, is unique to the industry. This material does not require thixotropic agents, fillers, or fibers to achieve the end result, is produced using typical mixing and metering equipment already found in the industry, and can be used in place of the now standard materials of the industry to eliminate the need for extrusion taping.

The non-flow behavior of the material of the present invention has the added advantage that poured liquid polymer does not slosh in the extrusion cavity, even without the addition of fillers, fibers, or thixotropic additives to achieve this end. It appears to be less sensitive to atmospheric moisture than typical polyurethane systems, as well as less sensitive to temperature extremes which affect the curing characteristics of polyurethanes. It has little to no "nozzle buildup" coupled with low linear wet shrinkage, whereas typical systems in the industry have either some nozzle buildup with little linear wet shrinkage or little nozzle buildup with higher linear wet shrinkage, nozzle buildup being the coating of the interior of the nozzle with reacted polymer and linear wet shrinkage being the shrinkage usually obtained at the ends of the extrusion when the material is transformed from a liquid to a solid. Also, coupled with the non-flowing nature of this material is the advantage of less cleanup time of involved machinery since, in usual practice, there is typically some spilling and flow from the ends of the extrusion, especially if the tape does not adhere well to the metal, but such a problem is minimized or eliminated with material of the invention.

Most molded plastics, molded in usual open or injection molds, or extruded into cavities by "cavity extrusion", for example, into a cavity in a window frame, suffer from the foregoing disadvantages, but the polymeric product of the invention does not. The thermally-stable short-flow time polyurethane-urea polymer of the present invention is constructed from a carefully selected combination of commercially-available reagents, and the invention comprises utilization of these components, which are of course old in themselves, in such a manner as to produce the final end product, the castable and curable thermosetting polyurethane-urea polymer, which is ideal for pouring in place as a thermal barrier, which serves a purpose which is not attainable by or with previously-available products, and which, by its very definition, is unique in the field. In particular, the polyurethane-urea polymer of the invention, when employed as a structural component, most conveniently can serve as an insulating medium in a thermalized (thermal barrier) aluminum extrusion window or door frame. Thus, the present invention provides a castable polyurethane-urea polymer which may be employed in a wide range of molded products. It can be painted and may be used for decorative purposes and for end products which are cast molded. It is also unique because its properties can be achieved without the addition of fillers and fibers and because it may conveniently be dispensed through conventional low-cost, low-pressure, plural component metering mixing machines.

The product of the invention has a well established market in the thermalized or thermal barrier aluminum extrusion window and door frame market, and in like applications. Using the conventional and generally-available equipment, but substituting the unique castable and curable thermosetting polyurethane-urea polymer of the present invention, which is characterized by improved flow characteristics, the art can readily adapt to the employment of the advantageous polymer of the present invention and utilize all of the desirable characteristics thereof to considerable operating and economic advantage.

Although the polymeric product of my U.S. Pat. No. 5,130,404, entitled Castable Thermosetting Polyurethane Polymer Having Improved Heat Stability, issued Jul. 14, 1992, is a definite step forward in the art, being characterized by excellent heat stability, it does not solve the problems of flow time and end waste without end taping, which are addressed and solved by the present invention.

OBJECTS OF THE INVENTION

It is an object of the present invention to provide an improved castable and curable thermosetting polyurethane-urea polymer, especially such type of polymer which is characterized by an improved and advantageously-short flow time, improved end-waste characteristics which eliminate the necessity of taping the ends of an extrusion channel into which "poured-in-place", and which has exceptional characteristics upon curing. Another object of the invention is to provide such a castable and curable thermosetting polyurethane-urea polymer which is made from a blend of readily-available components which may be conveniently dispensed for admixture together through conventional plural-component metering mixing machines and the like. Still another object of the invention is the provision of such a thermosetting polyurethane-urea polymer which does not require the incorporation of fillers and/or fibers. Yet an additional object of the invention is the provision of both bridged and debridged aluminum extrusions containing a polymer of the invention as a thermal barrier in a channel thereof.

Still other objects will become apparent hereinafter, and still additional objects will be apparent to one skilled in the art to which this invention appertains.

SUMMARY OF THE INVENTION

What I believe to be my invention, then, inter alia, comprises the following, singly or in combination:

A thermosetting castable and curable polyurethane-urea polymer having improved flow and end-waste characteristics, suitable for pouring into a channel in an aluminum extrusion to provide a thermal barrier upon curing of the polymer and debridgement of the channel, consisting essentially of the following inter-reacted components:

A) a polyisocyanate having a functionality of at least about 2;

B) at least one polyether diol or polyol having a molecular weight between about 2000 and about 6000 and an OH-functionality between about 2 and about 4;

C) a polyether diol or polyol having a molecular weight between about 300 and about 2000 and an OH-functionality between about 2 and about 4;

D) one or more glycols having a molecular weight between about 50 and 250 and an OH-functionality between about 1.8 and about 2.2;

E) a polyester diol or polyol having a molecular weight between about 250 and 1000 and an OH-functionality of about 1.5 to about 4;

F) a polyamine having a molecular weight between about 50 and about 4000 and an amine functionality of about 2 to about 4; and said constituent diols and polyols being in the proportion of 0 to about 85 percent by weight of B), about 5 to about 90 percent by weight of C), 0 to about 25 percent by weight of D), 0 to about 30 percent by weight of E), and about 2 to about 15 percent by weight of F), per 100 percent by weight of all diol and polyol and amine components; the combined percentage of B) and C) being about 40 to about 90 percent by weight;

G) an effective polyurethane-catalyzing amount of a urethane catalyst; and the isocyanate component A) and combined diol and polyol and amine components B), C), D), E), and F) being in proportions so as to provide an NCO ratio to the active hydrogen in all diol, polyol, and amine components of at least about 1:1, with the proviso that, when each of B), D), and E) are less than 5% by weight, then the molecular weight of C) is not greater than about 1500, the polymer having the following characteristics:

a flow time not greater than about six (6) seconds when poured into an aluminum channel 8 feet long, ¼ inch wide, and ½ inch deep at a temperature of approximately 77° F., a gel time not greater than about five minutes, and, when cured, a notched IZOD impact strength (PLI) greater than 0.5, a tensile strength (PSI) greater than 500, an elongation greater than 10%, and an at least 65 shore A hardness using a Rex durometer (especially in such cases where a rubbery polymer is not objectionable); such a polymer wherein the flow time is not greater about two (2) seconds; such a polymer wherein the isocyanate is a polymeric diphenyl methylene diisocyanate; such a polymer wherein the said constituent diols and polyols are in the proportion of about 13 to about 20 percent by weight of D), about 14 to about 18 percent by weight of E) and about 3 to about 10% by weight of F) per 100 percent by weight of all diol and polyol and amine components; the combined percentage of B) and C) being about 45 to about 72 percent by weight, the polymer having the following characteristics:

a flow time not greater than about six (6) seconds when poured into an aluminum channel 8 feet long, ¼ inch wide, and ½ inch deep at a temperature of approximately 77° F., a gel time not greater than about five minutes, and, when cured, a notched IZOD impact strength (PLI) greater than one (1), a tensile strength (PSI) greater than 2000, an elongation greater than 10%, an at least 65 Shore D hardness using a Rex durometer, and a heat distortion temperature greater than 120° F.; such a polymer wherein the flow time is not greater about two (2) seconds; such a polymer wherein the isocyanate is a polymeric diphenyl methylene diisocyanate; such a polymer wherein B) has an average molecular weight of about 4,500, an OH-functionality of 3, and a hydroxyl number of about 36; such a polymer wherein C) has a molecular weight of about 615, a functionality of 3, and a hydroxyl number of about 274; such a polymer wherein E) has a molecular weight of about 356, a functionality of 2, and a hydroxyl number of about 315; such a polymer wherein C) comprises a polyol having a molecular weight of about 598, a hydroxyl functionality of 4, and a hydroxyl number of about 375; such a polymer wherein F) has a molecular weight between about 170 and 440 and an average of two or three amine groups per molecule; such a castable polymer wherein the NCO/active hydrogen ratio is between about 1.03:1 and about 1.2:1; and such a poured and cured cast polymer.

Also, an undebridged aluminum extrusion having a channel filled with such a cast and cured polymer, and an aluminum extrusion having a debridged channel filled with such a cast and cured polymer.

Moreover, such a castable polymer wherein the polymeric diisocyanate comprises polymeric MDI (4,4'-diphenyl-methylene-diisocyanate), and such a castable polymer wherein the catalyst (G) comprises an effective amount of an amine or metal catalyst, and such a castable polymer comprising an effective amount of a drying agent; such a castable polymer comprising a molecular sieve drying agent in an effective amount between about 0.1 and about 1 percent by weight of resin component, and such a castable polymer wherein the drying agent comprises a zeolite.

Finally, such a polymer wherein B) has an average molecular weight of about 4,500, an OH-functionality of 3, and a hydroxyl number of about 36, wherein C) has a molecular weight of about 615, a functionality of 3, and a hydroxyl number of about 274, wherein E) has a molecular weight of about 356, a functionality of 2, and a hydroxyl number of about 315, and wherein F) has a molecular weight between about 170 and 440 and two or three amine groups per molecule, and such a castable polymer wherein the polymeric diisocyanate comprises polymeric MDI (4,4'-diphenyl-methylenediisocyanate).

GENERAL DESCRIPTION OF THE INVENTION

BRIEF DESCRIPTION OF THE DRAWINGS

Reference is now made to the drawings for a better understanding of the invention.

Figure 1:
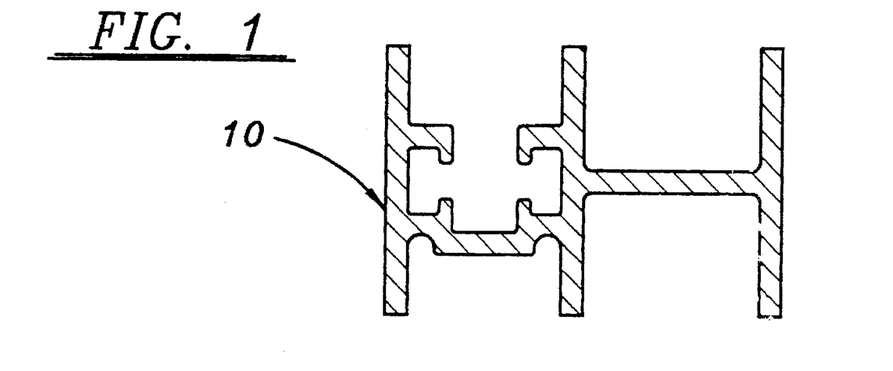
FIG. 1 is an end view of an aluminum extrusion having an elongated U-shaped channel for the pouring thereinto of a thermosetting castable thermal barrier polymer.
Figure 2:
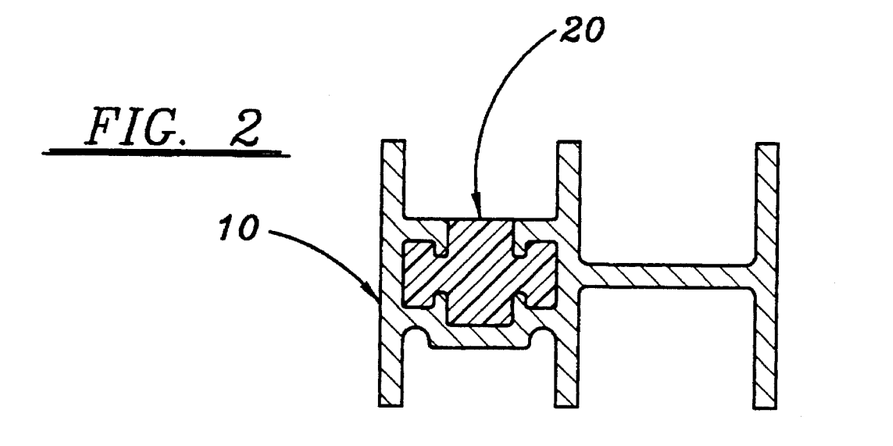
FIG. 2 is the same as FIG. 1 with the thermosetting castable thermal barrier polymer in place therein.
Figure 3:
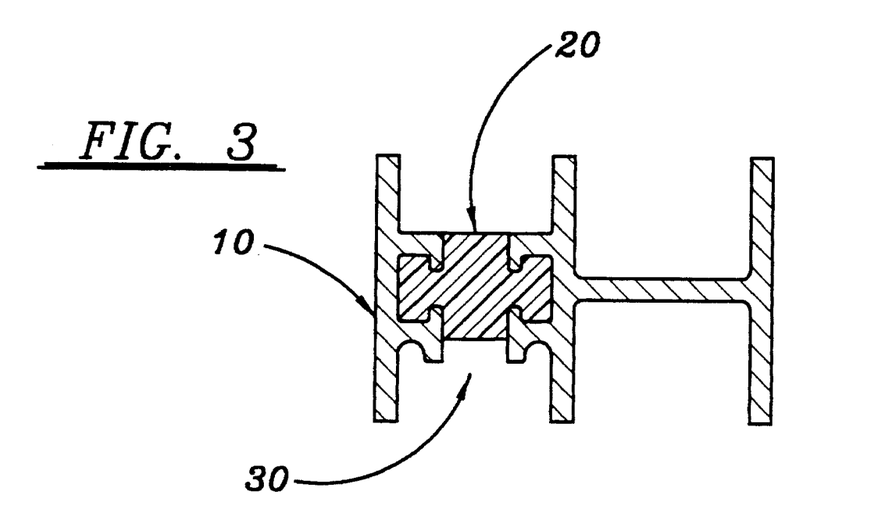
FIG. 3 is the same as FIG. 2 after debridgement of the channel by removal of a portion thereof so as to leave the thermosetting polymer as an insulating thermal barrier between the two segments of the extrusion.

In the Figures, the extrusion is identified by the number 10, the polymer by the number 20, and the portion of the extrusion removed by the debridgement is indicated at 30.

GENERAL CONSIDERATIONS

The Organic Polyisocyanate (Q)

Any reactive di- or polyisocyanate such as: toluene diisocyanate, diphenylene diisocyanate, or diphenylmethylene diisocyanate, having a functionality of at least 2.0.

The isocyanates which are used to react with these polymer resin systems can be most any commercially-available polyisocyanate having a functionality of at least 2.0. Some of the isocyanates which can be used are toluene diisocyanate, isophorone diisocyanate, polymeric methylene diphenylene diisocyanate, and diphenylmethylene diisocyanate. These isocyanates are reacted in stoichiometric equivalents based on the active hydrogen content of the components of the resin from an NCO/active H ratio of from 1:1 through 1.2:1 (preferred is 1.05:1 to 1.13:1) when producing polyurethane-ureas of the invention. NCO-terminated prepolymers may also be used.

Component (A), the organic isocyanate, advantageously comprises or consists essentially of a polymeric polyisocyanate PMDI, such polyisocyanates being poly(phenylene) poly(methylene)isocyanate (PAPI), also named poly (isocyanatophenylmethylene)phenyl isocyanate, produced by phosgenation of the reaction product of aniline with formaldehyde in acid media, or like polyisocyanates. The poly (phenylene)poly(methylene)isocyanates are disclosed, for example, in U.S. Pat. No. 3,916,060, and the preferred PMDI is polymeric MDI (4,4'-diphenylmethylenediisocyanate). These isocyanates generally have an isocyanate functionality of at least about 2 and generally between about 2.2 and 3.0. The diisocyanate is employed in approximately stoichiometric proportions with respect to the diol and polyol and amine components, that is, as is conventional in this art, so as to give an NCO to active hydrogen ratio of at least about 1:1, usually between about 1:1 and about 1.2:1, preferably between about 1.05:1 and about 1.13:1. Mondur MR® from Miles Inc. and PAPI 27 or 135 from Dow Chemical Company are representatively suitable polyisocyanates.

The Polyol (B)

The diol or polyol component (B) has a molecular weight between about 2000 and about 6000 and an OH-functionality between about 2.0 and about 4.0. Representative are:

| | Description |
|---|---|
| Olin Poly-G 85-36 ™ or equivalent Voranol 232-034 ™, Arcol 11-34 ™, or Multranol 9143 ™ | Polyether polyol having a molecular weight between about 2000 and 6000 and a functionality of at least 2, preferably between 2.0 and 4.0, whether ethylene oxide tipped, all propylene oxide chain, mixed propylene oxide and ethylene oxide chain, or all ethylene oxide chain, or any combination thereof |
| Olin Poly-G 85-36 ™ | a glycerol-started triol containing 65–70% primary hydroxyls with an average molecular weight of 4500 and an average hydroxyl value of of 36. |
| Olin-Poly-G ® 55-28 | a polyether diol having more than 60 ethyleneoxide moieties and a hydroxyl number of 28. |

The Polyetherdiol or Polyetherpolyol Component (C)

Polyether polyol Component C has a molecular weight between 300 and 2000 and a functionality of between 2.0 and 4.0 whether ethylene oxide tipped, all propylene oxide chain, mixed propylene oxide and ethylene oxide chain, or all ethylene oxide chain, or any combination thereof, and is preferably a glycerol- or sugar-based polyol. The basic polyol molecule, whether sugar or otherwise, is extended with a sufficient number of alkylene oxide molecules, e.g., propylene oxide, ethylene oxide, or combinations of the two, to provide the desired molecular weight and hydroxyl number. Suitable such polyols are commercially available.

Most preferred (C) polyether polyols are:

| | |
|---|---|
| Olin Poly-G 30-280 ™ | an all propylene oxide, glycerol-started triol with an average molecular weight of 615 and an average hydroxyl value of 274. |
| Olin Poly-G 74-376 ™ | a sucrose-initiated four functional polyol with an average molecular weight of 598 and an average hydroxyl value of 375. |
| Olin-Poly-G ® 55-112 | A polyetherdiol having a molecular weight of about 1000, an OH-functionality of about 2, and a hydroxyl number of about 112. |

Other competitive polyols may also be employed as component (C), for example, UCC Niax® diol PPG-725, a polyether diol having a molecular weight of about 760 and a hydroxyl number of about 147 is suitable, as well as UCC Niax® polyether diol PPG-1025, a diol having a molecular weight of about 1000 and a hydroxyl number of about 111. Another ethylene-oxide capped polyether diol suitable for use as diol component (C) is Fomrez® EPD-11, having a molecular weight of about 1000 and a hydroxyl number of about 112 (Witco Chemical Corporation).

The Glycol Component (D)

The glycol cross-linkers or chain extenders have a molecular weight between 50 and 250, a hydroxyl functionality between 1.8 and 2.2, and may be any short-chain cross-linking or chain-extending glycol such as: ethylene glycol, propylene glycol, diethylene glycol, dipropylene glycol, triethylene glycol, tripropylene glycol, or butane-diol, used singly or in combination with each other.

Such glycols are well-known commodities of commerce, and those available from The Dow Chemical Company are representative and entirely satisfactory.

The Polyester Diol or Polyol (E)

The polyester can be any of those polyester diols or polyols which are commercially available, such as Stepan PS-3152, PS-2002, PS-1752, Terate 403 or Terate 253, whether based on phthalate, terephthalate, or isophthalate, used singly or in combination, having a molecular weight between 250 and 1000 and a functionality of about 1.5 to 4, representatively:

| | |
|---|---|
| Stepan PS-3152 ™ | A 356 molecular weight phthalate polyester having a functionality of 2 and a hydroxyl value of 315. |
| Stepan PS-2002 ™ | A 560 molecular weight phthalate polyester having a functionality of 2 and hydroxyl value of 200. |
| Stepan PS-1752 ™ | A 640 molecular weight phthalate polyester having a functionality of 2 and a hydroxyl value of 175. |
| Cape Terate 403 ™ | A 330 molecular weight dimethyl terephthalate polyester having a functionality of 2 and a hydroxyl value of 340. |
| Cape Terate 253 ™ | A 300 molecular weight dimethyl terephthalate polyester having a functionality of 1.6 and a hydroxyl value of 300. |
| Commercially- | A 390 molecular weight polyester |

| | |
|---|---|
| available | triol having an average functionality of 2.5 and a hydroxyl value of 360. |

The Polyamine (F)

A polyamine having a molecular weight between about 50 and 4000 and a functionality of about 2 to about 4, such as ethylenediamine, diethyltoluenediamine (DETDA™ or Ethyl E-100™), or other polyamine such as isophorone diamine, di(methylthio)toluene diamine, diethylene triamine, or primary or secondary amine-terminated polyethers.

Some representative reactive polyamines are as follows:

| | Description |
|---|---|
| Diethyltoluenediamine | Diamine molecule of 178.28 molecular weight, amine value 629 |
| Di-(methylthio)toluenediamine | Diamine molecule of 214.4 molecular weight, amine value 523 |
| Isophorone diamine | Diamine molecule of 170.3 molecular weight, amine value 659 |
| Amine-terminated polyols | Such as the Texaco polyoxyalkyleneamines (Jeffamines ™) which are amine-terminated variations of polyols and can contain a backbone of propylene oxide, ethylene oxide, or mixed EO\PO composition. The diol materials are polypropylene glycol initiated and the triol materials are either glycerol or trimetholpropane initiated. These materials range in molecular weight from about 50 to about 4000. |
| Some examples are: | |
| Jeffamine ™ D-400 | A 400 molecular weight amine terminated polypropylene glycol diamine having an amine value of 281. |
| Jeffamine ™ D-2000 | A 2000 molecular weight amine-terminated polypropylene glycol diamine having an amine value of 56. |
| Jeffamine ™ T-403 | A 440 molecular weight amine terminated, propylene oxide based, trimetholpropane initiated triamine having an amine value of 392. |
| Jeffamine ™ EDR-148 | A 148 molecular weight amine-terminated polyethylene glycol diamine having an amine value of 758. |

The Catalyst (G)

Any polyurethane catalyst or catalyst-combination including amine or metal type catalysts may be used. The urethane catalyst is any of the commercially-available catalysts normally used for polyurethane production. Any of numerous amine-type catalysts can be utilized, such as: triethylene diamine, Texacat™ TD-33(33.3 weight % of TEDA in propylene glycol), Texacat DMDEE (2,2-dimorpholinodiethylether), Texacat TD-20 (N,N-dimethylethanolamine), Air Products DABCO™ R-8020 (a blend of 20% TEDA and 80% dimethylethanolamine), Air Products Polycat 5™ (pentamethyldiethylenetriamine), Air Products Polycat 8™ ((N,N-dimethylcyclohexylamine), and Air Products Polycat 77–50™ (bis(dimethylaminopropyl)methylamine) in dipropylene glycol). Metallic catalysts such as the following can also be used: Air Products DABCO K-15 (Potassium octoate), Air Products DABCO T-9 (Stannous octoate), Air Products DABCO T-12, Witco Chemical Corp. FOMREZ SUL-4™ (all of which are Dibutyltin dilaurate), and Witco Chemical Corp. FOMREZ UL-22™ (Dimethyltin dimercaptide), to name a few.

As effective polyurethane-catalyzing amount of a urethane catalyst (G) an amine catalyst is preferred, and diamine and especially triethylenediamine (TEDA) catalysts are particularly suitable. As such catalyst may be employed the Texacat® TD-33 or TD-33A catalysts (TEDA 33.3 wt. % solutions in propylene glycol and dipropylene glycol, respectively), or Texacat® DMDEE (2,2-dimorpholinodiethylether), from Texaco Chemical Company, or TD-20, N,N-dimethylethanolamine also from Texaco as well as the ZF-53 blend of TD-33A and ZF-22 (2,2-di(dimethylamino)diethyl ether), again from Texaco, DABCO® R-8020, a blend of amine catalysts, i.e., crystalline triethylenediamine 20% and dimethylethanolamine 80% (Air Products), or DABCO 33-LV® catalyst comprising 33% triethylenediamine and 67% dipropylene glycol (DPG) (Air Products), or Polycat 8® (N,N-dimethylcyclohexylamine or DMCHA) from Air Products, or Polycat 77–50® (tertiaryamine, i.e., bis(dimethylaminopropyl) methylamine)/dipropyleneglycol) (Air Products), or Polycat 9® (tris-(3-dimethylamino)propylamine) (Air Products), or TEDA (technically triethylenediamine or 1,4-diazobicyclo[2.2.2.]octane), a solid catalyst which must be dissolved in DPG or dimethylethanolamine (Focus Chemical Corp.), or UCC Niax® C-183, a mixture of dipropyleneglycol, triethylenediamine, and bis-(2-dimethylaminoethyl)-ether (Union Carbide).

The Drying Agent

Drying agents are not essential for this invention, but are useful to reduce bubble formation by eliminating the reaction of water with isocyanate. The drying agents are usually the commercially-available powdered molecular sieves having pore sizes of about three Angstroms. However, other water-reactive chemicals can be utilized, such as aminosilanes. These materials are used solely to remove moisture from the system. The molecular sieve is typically an alkalialuminosilicate of any of various pore sizes, but the three-Angstrom size works best for moisture absorption. An alternate method for removing moisture is to heat the resin for a short time in the presence of a vacuum.

Thus, the drying agent, when employed, is usually a molecular sieve, preferably of the zeolite type, and advantageously a zeolite in powder form having a pore size of no greater than about three (3) Angstrom units and, when employed, is ordinarily employed in an amount of about 0.1% to about 1% by weight of the combined polyol and diol and amine components which, together with the drying agent and amine catalyst, are sometimes referred to herein as the "resin component". The molecular sieve powder, Purmol® 3ST, an alkali alumino silicate from Zeochem, has been found to be particularly useful. Zeolites are alkali alumino silicates, as well known in the art. When the pore diameters of such molecular sieve powders are about 3 Angstrom units, the passages are sufficiently small so that no displaceable adsorbed gases are present therein. If larger pore diameter molecular sieves are employed, possibly-displaceable gases should be eliminated under vacuum before use to avoid possible bubbles and/or surface defects in the cast elastomer system.

THE METHOD IN GENERAL

The method by which production is accomplished is as follows: the polyether polyol(s), polyamine(s), polyesters (if used), glycol chain extenders (if used), and drying agent (if used) are blended together in suitable equipment, the catalyst is then added to yield the desired gel time in test mixes with the calculated amount of the isocyanate employed in accordance with the predetermined quality specifications; and, finally, this resin blend is mixed with the isocyanate at a 1.0:1 through 1.2:1 NCO/active H ratio based stoichiometrically upon the total active hydrogen in the components of the resin. The mixing of the resin and isocyanate is accomplished by hand or using typical mixing/metering equipment and open cast poured into the thermal barrier cavity or other open cast mold to produce the final polyurethane-urea product.

The mixed components can be used as pure liquids or fluids, with standard fillers or fibers being nonessential. The material can be applied from 70° F. to 150° F. and cures at room temperature through 180° F., the product being stable to at least this temperature and exhibiting a heat-distortion temperature greater than 120° F. The product builds its hardness rapidly and generally achieves its final properties after about one week.

The polyol ingredients are mixed together in the required proportion of diols, triols, or higher functionality polyether polyols with or without the polyester, with or without a drying agent (typically up to 1%), and with a catalyzing amount of an amine or metallic catalyst to achieve a workable gel time (about 0.01% to 5% catalyst). The important part of the resin blend is the polyamine which is present from 2% to 15% with the preferred level being between about 3% to 10% by weight of the total resin blend.

A production resin blend is first prepared by admixing the polyether diol or triol (C), such as Olin-Poly-G® 30–280 and/or 74–376, with any polyol (B), such as the Olin-Poly-G® 85–36, and any polyester diol (D), glycol (E), amine component (F) as well as drying agent, if such is to be employed. These active-hydrogen-containing components are blended together for a minimum of approximately two (2) hours, whereafter the catalyst is added to obtain a proper gel time of a test sample with the selected NCO (A) in correct proportions. The use of a drying agent may be obviated by heating the resin blend to approximately 100° C. and applying a vacuum to eliminate water from the system or by using dry components. The resultant resin component blend is then admixed with (A) the diisocyanate, such as PMDI, in approximately stoichiometric proportions with respect to the active hydrogen in the total quantity of diols and polyols and amines present in the resin component blend, the isocyanate index generally being between about 1.0 and 1.2. The blending can be accomplished by hand or more expeditiously in a usual mixing machine. The resinous polyurethane-urea product is then open cast, poured into an extrusion having an aperture provided therefor, or applied in a spray, or RIM (reinforced or unreinforced reaction molding) application, thus being adapted for the production of a wide variety of end-use parts and applications.

Also included in the composition is an effective catalyzing amount of a urethane catalyst and, optionally, a drying agent, the isocyanate and the combined diol and polyol and amine components being in proportions so as to provide an NCO to active hydrogen ratio between about 1:1 and about 1.2:1, this being normal for approximately stoichiometric proportions in the polyurethane-urea field, and usually preferably between about 1.03:1 and 1.13:1. The drying agent, when present, is usually present in powder form in an amount between about 0.1% and 1% parts by weight of the resin blend, and is usually a molecular sieve such as a Zeolite™ or the like, preferably having a pore size of no greater than about three (3) Angstrom units, which is present for purposes of removing water. In the absence of a drying agent, a temporarily elevated temperature and vacuum may be employed for the same purpose. As to the amount of catalyst, any effective urethane-catalyzing amount may be employed, and this amount is usually up to about 5%, e.g., between about 0.01% and about 2%, by weight of the resin component, and in any event is as conventional in the polyurethane art.

The two-component mixture involved can be used as a purely fluid or liquid system, or filled with standard fillers or fibers, or applied together with chopped fiber or fiber matting materials, but such fillers and fibers are not necessary for the attainment of satisfactory and advantageous properties and characteristics in the cast and cured polyurethane-urea elastomer of the invention. The application temperature may range from about 70° F. to about 150° F., depending upon the intended application. The product cures by standing at room temperature or above, generally up to about 180° F., at which temperature the product is completely stable. The product rapidly attains satisfactory hardness characteristics and is generally allowed to cool in an approximately 77° F. environment for a one-week period to obtain its final advantageous properties and characteristics, as will be seen from the product test characteristics and data presented herein.

Relative Proportions of Ingredients

For the diol, polyol, glycol, polyester diol or polyol, and amine resin-forming components, the relative proportions are as set forth in detail under "Summary of the Invention", which is incorporated here by reference.

DETAILED DESCRIPTION OF THE INVENTION

The following Examples are given by way of illustration only, and are not to be construed as limiting.

EXAMPLE 1

A laboratory blend of five gallons was produced as follows:

The following ingredients were charged into a clean five-gallon container at room temperature: Seven thousand, six hundred and fourteen (7,614) grams of polyether triol Poly-G 85–36™, with a molecular weight of 4500, nominal functionality of 3, about 70% primary hydroxyl and a hydroxyl number of 36. One thousand seven hundred seventy (1,770) grams of polyether triol Poly-G 30–280™, with a molecular weight of 615, nominal functionality of 3, all secondary hydroxyl and a hydroxyl number of 274. Three thousand forty two (3,042) grams of phthalate polyester diol PS-3152™, with a molecular weight of 356, nominal functionality of 2 and a hydroxyl number of 315. One thousand five hundred twenty three (1,523) grams each of dipropylene glycol and diethylene glycol and five hundred forty nine (549) grams of ethylene glycol. Ninety one (91) grams of molecular sieve drying agent (Purmol™ 3ST, a three-Angstrom pore size zeolite powder from Zeochem). One thousand six hundred fifty two (1,652) grams of Jeffamine™ T-403, with a molecular weight of 440, propylene oxide-based triamine, and an amine value of 392. These ingredients were allowed to mix to homogeneity. Next, two hundred thirty six (236) grams of triethylene-diamine catalyst (Texaco TD-33) was added and the ingredients again allowed to mix to homogeneity.

A sample was taken from the container, admixed with polymeric MDI (4,4'-diphenyldimethylene-diisocyanate) in the proper 88.5/100 part proportion, and the gel time of the resulting product sample measured to ensure product consistency. The gel time must be 17 ½ seconds ±½ second by hand mix and 12 ½ seconds ±½ second by machine mix. The thus-checked main body of the resultant product was mixed with polymeric MDI through a mechanical metering device. The polymeric MDI was mixed at 88.5 parts by weight to 100 parts by weight of the polyol/polyamine blend. The temperature of both chemical constituents was nominally 77° F.

The reaction product is then poured into metal extrusions having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

EXAMPLE 2

A laboratory blend of five gallons was produced as follows:

The following ingredients were charged into a clean five-gallon container at room temperature: Seven thousand five hundred seventy-four (7,574) grams of polyether triol Poly-G 85–36™, with a molecular weight of 4500, nominal functionality of 3, about 70% primary hydroxyl and a hydroxyl number of 36. Three thousand four hundred six (3,406) grams of polyether triol Poly-G 30–28™, with a molecular weight of 615, nominal functionality of 3, all secondary hydroxyl and a hydroxyl number of 274. Three thousand twenty six (3,026) grams of phthalate polyester diol PS-3152™, with a molecular weight of 356, nominal functionality of 2 and a hydroxyl number of 315. One thousand five hundred fourteen (1,514) grams of dipropylene glycol, eighty hundred eight (808) grams of diethylene glycol and five hundred forty five (545) grams of ethylene glycol. Ninety (90) grams of molecular sieve drying agent (Purmol™ 3ST, a three-Angstrom pore size zeolite powder from Zeochem). Eight hundred three (803) grams of IPDA (isophoronediamine, a 170.3 molecular weight diamine molecule) with an amine value of 659. These ingredients are allowed to mix to homogeneity. Next, two hundred thirty four (234) grams of triethylene-diamine catalyst (Texaco TD-33) is added and the ingredients again allowed to mix to homogeneity.

A sample is taken from the container, admixed with polymeric MDI in the proper 82.5/100 part proportion, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 82.5 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

EXAMPLE 3

A laboratory blend of five gallons was produced as follows:

The following ingredients were charged into a clean five-gallon container at room temperature: Seven thousand seven hundred six (7,706) grams of polyether triol Poly-G 85–36™, with a molecular weight of 4500, nominal functionality of 3, about 70% primary hydroxyl and a hydroxyl number of 36. Three thousand three hundred sixty eight (3,368) grams of polyether triol Poly-G 30–280™, with a molecular weight of 615, nominal functionality of 3, all secondary hydroxyl and a hydroxyl number of 274. Three thousand eighty (3,080) grams of phthalate polyester diol PS-3152™, with a molecular weight of 356, nominal functionality of 2 and a hydroxyl number of 315. Eight hundred twenty three (823) grams of dipropylene glycol, one thousand five hundred forty one (1,541) grams of diethylene glycol and five hundred fifty four (554) grams of ethylene glycol. Ninety two (92) grams of molecular sieve drying agent (Purmol™ 3ST, a three Angstrom pore size zeolite powder from Zeochem). Eight hundred ten (810) grams of DETDA (diethyltoluenediamine, a 178.28 molecular weight diamine molecule) with an amine value of 629. These ingredients are allowed to mix to homogeneity. Next, twenty seven (27) grams of Foamrez™ UL-22 catalyst (dimethyltin dimercaptide-Witco) is added and the reaction mixture again allowed to mix to homogeneity.

A sample is taken from the container, admixed with polymeric MDI in the proper 82/100 part proportions, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 82 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

EXAMPLE 4

A laboratory blend of five gallons was produced as follows:

The following ingredients were charged into a clean five-gallon container at room temperature: Seven thousand six hundred sixty six (7,666) grams of polyether triol Poly-G 85–36™, with a molecular weight of 4500, nominal functionality of 3, about 70% primary hydroxyl and a hydroxyl number of 36. Two thousand seven hundred twenty (2,720) grams of polyether triol Poly-G 30–280™, with a molecular weight of 615, nominal functionality of 3, all secondary hydroxyl and a hydroxyl number of 274. Three thousand sixty four (3,064) grams of phthalate polyester diol PS-3152™, with a molecular weight of 356, nominal functionality of 2 and a hydroxyl number of 315. Eight hundred twenty four (824) grams of dipropylene glycol, one thousand six hundred thirty six (1,636) grams of diethylene glycol and five hundred forty five (545) grams of ethylene glycol. Ninety two (92) grams of molecular sieve drying agent (Purmol™ 3ST, a three-Angstrom pore size zeolite powder from Zeochem). Five hundred forty five (545) grams of Poly-G 74–376™, a sucrose-based polyol having a functionally of 4, a molecular weight of 598, and a hydroxyl value of 375. Eight hundred ten (810) grams of DETDA (diethyltoluenediamine, a 178.28 molecular weight diamine molecule) with an amine value of 629. These ingredients are allowed to mix to homogeneity. Next, fifteen (15) grams of UL-22 and seventy five (75) grams of Polycat 5™ (pentamethyldiethylenetriamine—Air Products) are added and the reaction mixture again allowed to mix to homogeneity.

A sample is taken from the container, admixed with polymeric MDI in the proper 83.3/100 part proportion, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 83.3 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

EXAMPLE 5

A laboratory blend of five gallons was produced as follows:

The following ingredients were charged into a clean five-gallon container at room temperature: Eight thousand two hundred eighty seven (8,287) grams of polyether triol Poly-G 85–36™, with a molecular weight of 4500, nominal functionality of 3, about 70% primary hydroxyl and a hydroxyl number of 36. Four thousand one hundred eighteen (4,118) grams of polyether triol Poly-G 30–280™, with a molecular weight of 615, nominal functionality of 3, all secondary hydroxyl and a hydroxyl number of 274. One thousand six hundred sixty five (1,665) grams of dipropylene glycol, one thousand seven hundred thirty seven (1,737) grams of diethylene glycol and five hundred eighty nine (589) grams of ethylene glycol. Five hundred eighty nine (589) grams of Poly-G 74–376™, a sucrose based polyol having a functionality of 4, a molecular weight of 598, and a hydroxyl value of 375. Ninety nine (99) grams of molecular sieve drying agent (Purmol™ 3ST, a three-Angstrom pore size zeolite powder from Zeochem). Eight hundred ten (810) grams of DETDA (diethyltoluenediamine, a 178.28 molecular weight diamine molecule) with an amine value of 629. These ingredients are allowed to mix to homogeneity. Next, fifteen (15) grams of UL-22 and seventy five (75) grams of Polycat 5™ are added and the reaction mixture again allowed to mix to homogeneity.

A sample is taken from the container, admixed with polymeric MDI in the proper 88.1/100 part proportion, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 88.1 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

Examples as Percentages

| Chemical | Weight Percentage in Formulation | Chemical | Weight Percentage in Formulation |
|---|---|---|---|
| Example 1 | | Example 2 | |
| Poly-G 85-36 | 42.30 | Poly-G 85-36 | 42.08 |
| 3A Molecular Sieve | 0.51 | 3A Molecular Sieve | 0.50 |
| Poly-G 30-280 | 9.83 | Poly-G 30-280 | 18.92 |
| PS-3152 | 16.90 | PS-3152 | 16.81 |
| Dipropylene Glycol | 8.46 | Dipropylene Glycol | 8.41 |
| Diethylene Glycol | 8.46 | Diethylene Glycol | 4.49 |
| Ethylene Glycol | 3.05 | Ethylene Glycol | 3.03 |
| T-403 | 9.18 | IPDA | 4.46 |
| Texaco TD-33 | 1.31 | Texaco TD-33 | 1.30 |
| Example 3 | | Example 4 | |
| Poly-G 85-36 | 42.81 | Poly-G 85-36 | 42.61 |
| 3A Molecular Sieve | 0.51 | 3A Molecular Sieve | 0.51 |
| Poly-G 30-280 | 18.71 | Poly-G 30-280 | 15.12 |
| PS-3152 | 17.11 | PS-3152 | 17.03 |
| Dipropylene Glycol | 4.57 | Dipropylene Glycol | 4.58 |
| Diethylene Glycol | 8.56 | Diethylene Glycol | 9.09 |
| Ethylene Glycol | 3.08 | Ethylene Glycol | 3.05 |
| DETDA | 4.50 | DETDA | 4.50 |
| UL-22 | 0.15 | UL-22 | 0.08 |
| | | Poly-G74-376 | 3.03 |
| | | Polycat 5 | 0.42 |
| Example 5 | | | |
| Poly-G 85-36 | 46.07 | | |
| 3A Molecular Sieve | 0.55 | | |
| Poly-G 30-280 | 22.90 | | |
| Dipropylene Glycol | 9.26 | | |
| Diethylene Glycol | 9.66 | | |
| Ethylene Glycol | 3.28 | | |
| DETDA | 4.50 | | |
| Poly-G 74-376 | 3.28 | | |
| UL-22 | 0.08 | | |
| Polycat 5 | 0.42 | | |

Example 6

| Chemical | Weight Percentage in Formulation |
|---|---|
| Poly-G 30-280 ™ | 88.85 |
| DETDA | 10 |
| Dibutyltin dilaurate | 0.15 |

The ingredients of the resin blend are thoroughly admixed as in the previous Examples 1–5.

A sample is taken from the container, admixed with polymeric MDI in the proper 76.64/100 part proportion, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 76.64 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

Example 7

| Chemical | Weight Percentage in Formulation |
| --- | --- |
| Poly-G 85-36 | 38.5 |
| 3A Molecular Sieve | 1.16 |
| Poly-G 30-280 | 20.61 |
| PS 3152 | 29.38 |
| DETDA | 10.2 |
| Dibutyltin dilaurate | 0.15 |

The ingredients of the resin blend are thoroughly admixed as in the previous Examples 1–5.

A sample is taken from the container, admixed with polymeric MDI in the proper 56.28/100 part proportions, and the gel time of the resulting product sample is measured to ensure product consistency. The gel time must be 17 ½ seconds ±½ second by hand mix and 12 ½ seconds ±½ second by machine mix. The thus-checked main body of the resultant product is mixed with polymeric MDI through a mechanical metering device. The polymeric MDI is mixed at 56.28 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

Example 8

| Chemical | Weight Percentage in Formulation |
| --- | --- |
| Poly-G 85-36 ™ | 66.26 |
| 3A Molecular Sieve | 1.58 |
| Dipropylene Glycol | 7.06 |
| Diethylene Glycol | 13.23 |
| Ethylene Glycol | 4.76 |
| DETDA | 6.96 |
| Dibutyltin dilaurate | 0.15 |

The ingredients of the resin blend are thoroughly admixed as in the previous Examples 1–5.

A sample is taken from the container, admixed with polymeric MDI in the proper 86.95/100 part proportions, and the gel time of the resulting product sample is measured to ensure product consistency. The gel time must be 17½ seconds ±½ second by hand mix and 12 ½ seconds ±½ second by machine mix. The thus-checked main body of the resultant product is mixed with polymeric MDI through a mechanical metering device. The polymeric MDI is mixed at 86.95 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

The following examples illustrate how a twelve-drum production batch is produced:

Production Example 9

The following ingredients are introduced into a clean blending tank at room temperature: Two thousand four hundred twenty (2420) pounds of polyether triol Poly-G 85–36™, with a molecular weight of 4500, nominal functionality of 3, about 70% primary hydroxyl and a hydroxyl number of 36. One thousand fifty eight (1058) pounds of polyether triol Poly-G 30–280™, with a molecular weight of 615, nominal functionality of 3, all secondary hydroxyl and a hydroxyl number of 274. Nine hundred sixty seven (967) pounds of phthalate polyester diol PS-3152™, with a molecular weight of 356, nominal functionality of 2 and a hydroxyl number of 315. Two hundred fifty eight (258) pounds of dipropylene glycol, four hundred eighty four (484)pounds of diethylene glycol and one hundred seventy four (174) pounds of ethylene glycol. Twenty nine (29) pounds of molecular sieve drying agent (Purmol™ 3ST, a three-Angstrom pore size zeolite powder from Zeochem). Two hundred fifty four (254) pounds of DETDA (diethyl-toluenediamine, a 178.28 molecular weight diamine molecule) with an amine value of 629. These ingredients are allowed to mix to homogeneity for one and one-half to two hours. Next, eight and one half (8.5) pounds of UL-22 catalyst is added and the mixture again allowed to mix to homogeneity over a period of two hours.

A sample is taken from the container, admixed with polymeric MDI in the proper 82/100 part proportions, and the gel time and other quality control specifications of the resulting product sample measured to ensure product consistency. The water content must be below 0.06 percent, the gel time must be 17 ½ seconds ±½ second by hand mix and 12 ½ seconds ±½ second by machine mix, and the other quality control specifications are 500 cps±100 cps, and a specific gravity of 1.070±0.005. The thus checked main body of the resultant product is mixed with polymeric MDI through a mechanical metering device. The polymeric MDI is mixed at 82 parts by weight to 100 parts by weight of the polyol/polyamine blend. The temperature of both chemical constituents is nominally 77° F.

The reaction product is then poured into metal extrusions,, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12 ½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

Production Example 10

The following ingredients are introduced into a clean blending tank at room temperature: Two thousand four hundred twenty (2420) pounds of polyether triol Poly-G 85–36™, with a molecular weight of 4500, nominal functionality of 3, about 70% primary hydroxyl and a hydroxyl number of 36. One thousand fifty eight (1058) pounds of polyether triol Poly-G 30–280™, with a molecular weight of 615, nominal functionality of 3, all secondary hydroxyl and a hydroxyl number of 274. Nine hundred sixty seven (967) pounds of phthalate polyester diol PS-3152™, with a molecular weight of 356, nominal functionality of 2 and a hydroxyl number of 315. Two hundred fifty eight (258) pounds of dipropylene glycol, four hundred eighty four (484) pounds of diethylene glycol and one hundred seventy four (174) pounds of ethylene glycol. These ingredients are allowed to mix to homogeneity for one and one-half to two hours. The blend is heated to 220° F. under vacuum and constant blending for two hours to drive off any moisture. The vacuum is released, the temperature is decreased and two hundred fifty four (254) pounds of DETDA (diethyltoluenediamine, a 178.28 molecular weight diamine molecule with an amine value of 629) is added. These ingredients are allowed to mix to homogeneity for one and one-half to two hours. Next, eight and one half (8.5) pounds of UL-22 catalyst is added and the mixture again allowed to mix to homogeneity over a period of two hours.

A sample is taken from the container, admixed with polymeric MDI in the proper 82/100 part proportion, and the gel time and other quality control specifications of the resulting product sample measured to ensure product consistency. The water content must be below 0.06 percent, the gel time must be 17 ½ seconds ±½ second by hand mix and 12 ½ seconds ±½ second by machine mix, and the other quality control specifications are 500 cps±100 cps, and a specific gravity of 1.070±0.005. The thus checked main body of the resultant product is mixed with polymeric MDI through a mechanical metering device. The polymeric MDI is mixed at 82 parts by weight to 100 parts by weight of the polyol/polyamine blend. The temperature of both chemical constituents is nominally 77° F.

The reaction product is then poured into metal extrusions, having a cavity 8 feet long, ¼ inch wide, and ½ inch deep and into plate molds to test for physical properties at an initial temperature of 77° F. The mixture thickens instantly (within 1 to 3 seconds) to form a gelatinous, non-flowing material which reacts exothermically to form a polyurethane-urea solid in about 12½ seconds. The molded plates for physical testing are placed in an oven at 160° F. for two hours to cure and then removed and allowed to equilibrate to room temperature (77° F.) to obtain final properties. The extrusion is allowed to cool in a room temperature (nominal 77° F.) environment for a one-week period to obtain the properties of the cured polymer contained therein.

The following physical property tests are performed on the cured polyurethane-urea products:

| Tensile Strength | ASTM D638 |
|---|---|
| Elongation at Break | ASTM D638 |
| Notched Izod Impact | ASTM D256 |
| Heat Distortion temperature at 66 psi (HDT) | ASTM D648 |

The following physical test results were performed on products identically cured at 160° F. for two hours or seven days at room temperature (72° F.). These are two standard cure methods for property comparisons.

| | Example 1 | Example 2 |
|---|---|---|
| Notched Izod Impact (PLI) | 1.23 | 1.33 |
| Tensile Strength (PSI) | 5200 | 4900 |
| Elongation | 10% | 10% |
| Heat Distortion Temperature | 166° F. | 164° F. |
| Debridge time*** | 6 minutes | 6 minutes |
| Gel time** | 14 seconds | 12 seconds |
| Flow Time* | 1 second | 1 second |
| End waste due to leakage without tape**** | <¼ inch | <¼ inch |

| | Example 3 | Example 4 | Example 5 |
|---|---|---|---|
| Notched Izod Impact (PLI) | 2.20 | 1.71 | 1.45 |
| Tensile Strength (PSI) | 4900 | 4100 | 4800 |
| Elongation | 57% | 35% | 38% |
| Heat Distortion Temperature | 145° F. | 153° F. | 145° F. |
| Debridge time*** | 6 minutes | 6 minutes | 6 minutes |
| Gel Time** | 17 seconds | 14 seconds | 17 seconds |
| Flow Time* | 1.5 seconds | 1.5 seconds | 1.5 seconds |
| End waste due to leakage without tape**** | <¼ inch | <¼ inch | <¼ inch |

| | Example 8 | Example 9 | Example 10 |
|---|---|---|---|
| Notched Izod Impact (PLI) | 1.30 | 2.48 | 1.80 |
| Tensile Strength (PSI) | 5500 | 3100 | 4100 |
| Elongation | 40% | 39% | 39% |
| Heat Distortion Temperature | 150° F. | 130° F. | 145° F. |
| Debridge time*** | 6 minutes | 6 minutes | 6 minutes |
| Gel time** | 17 seconds | 17 seconds | 17 seconds |
| Flow Time* | 2 seconds | 2 seconds | 1.5 seconds |
| End waste due to leakage without tape**** | <¼ inch | <¼ inch | <¼ inch |

| Previous Standard In-House System for Comparison A | |
|---|---|
| Notched Izod Impact (PLI) | 2.0 |
| Tensile Strength (PSI) | 5500 |
| Elongation | 20+% |
| Heat Distortion Temperature | 153° F. |
| Debridge time*** | 5 minutes |
| Gel Time** | 17 seconds |
| Flow Time* | 16 seconds |
| End waste due to leakage without tape**** | 6 inches |

| Component | Preferred Resin Formulation of Current Invention | Previous In-house Resin Formulation for Comparison B |
|---|---|---|
| Poly-G 85-36 | 42.81% | |
| Poly-G 30-280 | 18.71% | |
| 3A Powder | 0.51% | 1.03% |
| PS-3152 | 17.11% | |
| Dipropylene Glycol | 4.57% | 15.63% |
| Diethylene Glycol | 8.56% | |
| Ethylene Glycol | 3.08% | |
| Diethyltoluenediamine | 4.50% | |
| Isocyanate | | 1.01% |
| UL-22 | 0.15% | |

-continued

| | | |
|---|---|---|
| TD-33 | | 2.06% |
| Poly-G 75-442 | | 41.68% |
| Poly-G 55-112 | | 39.60% |

| | Preferred Formulation | Previous In-House System |
|---|---|---|
| Notched Izod Impact (PLI) | 2.20 | 1.4 |
| Tensile Strength (PSI) | 4900 | 10,500 |
| Elongation | 57% | 10% |
| Heat Distortion Temperature | 145° F. | 184° F. |
| Debridge time*** | 6 minutes | 15 minutes |
| Gel Time** | 17 seconds | 30 seconds |
| Flow Time* | 1.5 seconds | 27 seconds |
| End waste due to leakage without tape**** | <¼ inch | >10 inches |

| | Competitive Product I | Competitive Product II |
|---|---|---|
| Notched Izod Impact (PLI) | 2.3 | 1.7 |
| Tensile Strength (PSI) | 5100 | 7000 |
| Elongation | 30% | 80% |
| Heat Distortion Temperature | 158° F. | 150° F. |
| Debridge time*** | 5 minutes | 5 minutes |
| Gel Time** | 10 seconds | 12–18 seconds |
| Flow Time* | 9 seconds | 11–17 seconds |
| End waste due to leakage without tape**** | >4 inch | >6 inches |

*Flow time is defined as the time at which the material no longer flows.
**Gel time is the point at which the chemical goes from a liquid to a solid.
***Debridge time is the time required for the product to reach a 65 Shore D hardness using a Rex Durometer ™.
***A 65 Shore A hardness is sometimes satisfactory when a rubbery polymer is unobjectionable.
****When polymer is poured into the cavity of an aluminum extrusion, the cavity being 8 feet long, ¼ inch wide, and ½ inch deep.

The most important characteristic of the present system is the flow time, which is optimized between about 1 ½ to 2 seconds to obtain the best overall performance, although a flow time between about 0.5 and 6 seconds is satisfactory.

As is apparent, the performance parameters of the foregoing products of the present invention exceed the performance parameters of any known castable polyurethane or polyurethane/urea or other polymeric elastomer used for the manufacture of thermal barriers, especially in thermal barrier window and door extrusions, whether in house or provided by reputable competitors.

It is therefore seen that an improved and highly advantageous thermosetting castable polyurethane/urea polymer or elastomer, suitable for all of its intended purposes and uses, and having the aforesaid improved characteristics, is provided by the present invention, with all of its attendant advantages in use.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. A thermosetting castable and curable polyurethane-urea polymer having improved flow and end-waste characteristics, suitable for pouring into a channel in an aluminum extrusion to provide a thermal barrier upon curing of the polymer and debridgement of the channel, consisting essentially of the following inter-reacted components:

A) a polyisocyanate having a functionality of at least about 2;

B) at least one polyether diol or polyol having a molecular weight between about 2000 and about 6000 and an OH-functionality between about 2 and about 4;

C) a polyether diol or polyol having a molecular weight of 300 to less than 2000 and an OH-functionality between about 2 and about 4;

D) one or more glycols having a molecular weight between about 50 and 250 and an OH-functionality between about 1.8 and about 2.2;

E) a polyester diol or polyol having a molecular weight between about 250 and 1000 and an OH-functionality of about 1.5 to about 4;

F) a polyamine having a molecular weight between about 50 and about 4000 and an amine functionality of about 2 to about 4; and said constituent diols and polyols being in the proportion of 0 to about 85 percent by weight of B), about 5 to about 90 percent by weight of C), 0 to about 25 percent by weight of D), 0 to about 30 percent by weight of E), and about 2 to about 15 percent by weight of F), per 100 percent by weight of all diol and polyol and amine components; the combined percentage of B) and C) being about 40 to about 90 percent by weight;

G) an effective polyurethane-catalyzing amount of a urethane catalyst; and the isocyanate component A) and combined diol and polyol and amine components B), C), D), E), and F) being in proportions so as to provide an NCO ratio to the active hydrogen in all diol, polyol, and amine components of at least about 1:1, with the proviso that, when all three of B), D), and E) are each present at less than 5% by weight, then the molecular weight of C) is about 1500 or less, the polymer having the following characteristics:

a flow time not greater than about six (6) seconds when poured into an aluminum channel 8 feet long, ¼ inch wide, and ½ inch deep at a temperature of approximately 77° F., a gel time not greater than about five minutes, and, when cured, a notched IZOD impact strength (PLI) greater than 0.5, a tensile strength (PSI) greater than 500, an elongation greater than 10%, and an at least 65 shore A hardness using a Rex durometer.

2. A polymer of claim 1, wherein the flow time is not greater about two (2) seconds.

3. A polymer of claim 1, wherein the polyisocyanate is a polymeric diphenyl methylene diisocyanate.

4. polymer of claim 1, wherein the said constituent diols and polyols are in the proportion of about 13 to about 20 percent by weight of D), about 14 to about 18 percent by weight of E) and about 3 to about 10% by weight of F) per 100 percent by weight of all diol and polyol and amine components; the combined percentage of B) and C) being about 45 to about 72 percent by weight, the polymer having the following characteristics:

a flow time not greater than about six (6) seconds when poured into an aluminum channel 8 feet long, ¼ inch wide, and ½ inch deep at a temperature of approximately 77° F., a gel time not greater than about five minutes, and, when cured, a notched IZOD impact strength (PLI) greater than one (1), a tensile strength (PSI) greater than 2000,
an elongation greater than 10%,
an at least 65 Shore D hardness using a Rex durometer,
and a heat distortion temperature greater than 120° F.

5. A polymer of claim 4, wherein the flow time is not greater about two (2) seconds.

6. A polymer of claim 5 wherein B) has an average molecular weight of about 4,500, an OH-functionality of 3, and a hydroxyl number of about 36, wherein C) has a molecular weight of about 615, a functionality of 3, and a hydroxyl number of about 274, wherein E) has a molecular weight of about 356, a functionality of 2, and a hydroxyl number of about 315, and wherein F) has a molecular weight between about 170 and 440 and two or three amine groups per molecule.

7. A castable polymer of claim 6, wherein the polyisocyanate comprises polymeric MDI (4,4'-diphenyl-methylene-diisocyanate).

8. A polymer of claim 4, wherein the polyisocyanate is a polymeric diphenyl methylene diisocyanate.

9. A polymer of claim 1 or claim 4 wherein B) has an average molecular weight of about 4,500, an OH-functionality of 3, and a hydroxyl number of about 36.

10. A polymer of claim 1 or claim 4 wherein C) has a molecular weight of about 615, a functionality of 3, and a hydroxyl number of about 274.

11. A polymer of claim 1 or claim 4 wherein E) has a molecular weight of about 356, a functionality of 2, and a hydroxyl number of about 315.

12. A polymer of claim 1 or claim 4 wherein C) comprises a polyol having a molecular weight of about 598, a hydroxyl functionality of 4, and a hydroxyl number of about 375.

13. A polymer of claim 1 or claim 4 wherein F) has a molecular weight between about 170 and 440 and an average of two or three amine groups per molecule.

14. A castable polymer of claim 1 or claim 4, wherein the NCO/active hydrogen ratio is between about 1.03:1 and about 1.2:1.

15. A castable polymer of claim 14, wherein the polyisocyanate comprises polymeric MDI (4,4'-diphenyl-methylene-diisocyanate).

16. A poured and cured cast polymer of claim 1 or claim 4.

17. A castable polymer of claim 1 or claim 4, wherein the catalyst (G) comprises an effective amount of an amine or metal catalyst.

18. A castable polymer of claim 1 or claim 4, comprising an effective amount of a drying agent.

19. A castable polymer of claim 18, comprising a molecular sieve drying agent in an effective amount between about 0.1 and about 1 percent by weight of resin component.

20. A castable polymer of claim 18, wherein the drying agent comprises a zeolite.

21. A polymer of claim 1 wherein B) has an average molecular weight of about 4,500, an OH-functionality of 3, and a hydroxyl number of about 36, wherein C) has a molecular weight of about 615, a functionality of 3, and a hydroxyl number of about 274, wherein E) has a molecular weight of about 356, a functionality of 2, and a hydroxyl number of about 315, and wherein F) has a molecular weight between about 170 and 440 and two or three amine groups per molecule.

22. A castable polymer of claim 21, wherein the polyisocyanate comprises polymeric MDI (4,4'-diphenyl-methylene-diisocyanate).

23. An undebridged aluminum extrusion having a channel filled with a cast and cured polymer of claim 1 or claim 4.

24. An aluminum extrusion having a debridged channel filled with a cast and cured polymer of claim 1 or claim 4.

* * * * *

UNITED STATES PATENT AND TRADEMARK OFFICE
CERTIFICATE OF CORRECTION

PATENT NO. : 5,554,713
DATED : Sept. 10, 1996
INVENTOR(S) : Gerard S. Freeland

It is certified that error appears in the above-indentified patent and that said Letters Patent is hereby corrected as shown below:

Column 6, line 3: "The Organic Polyisocyanate (Q)"
    should read -- The Organic Polyisocyanate (A) --.

Column 9, line 17: Delete the "-" at the end of the line
    and insert -- ) --.

Column 9, line 18: Delete the ")" at the beginning of
    the line.

Column 9, line 26: Delete the "-" at the end of the line
    and insert -- ) --.

Column 9, line 27: Delete the ")" at the beginning of
    the line.

Signed and Sealed this

Seventeenth Day of December, 1996

Attest:

BRUCE LEHMAN

Attesting Officer    Commissioner of Patents and Trademarks